(12) United States Patent
Shimizu et al.

(10) Patent No.: US 7,366,814 B2
(45) Date of Patent: Apr. 29, 2008

(54) HETEROGENEOUS MULTIPROCESSOR SYSTEM AND OS CONFIGURATION METHOD THEREOF

(75) Inventors: Masaaki Shimizu, Mitaka (JP); Naonobu Sukegawa, Inagi (JP)

(73) Assignee: Hitachi, Ltd., Tokyo (JP)

( * ) Notice: Subject to any disclaimer, the term of this patent is extended or adjusted under 35 U.S.C. 154(b) by 237 days.

(21) Appl. No.: 11/357,088

(22) Filed: Feb. 21, 2006

(65) Prior Publication Data

US 2007/0124523 A1   May 31, 2007

(30) Foreign Application Priority Data

Nov. 28, 2005   (JP) ............... 2005-341863

(51) Int. Cl.
G06F 13/24   (2006.01)
(52) U.S. Cl. ..................... 710/268; 710/263
(58) Field of Classification Search ......... 710/260–269
See application file for complete search history.

(56) References Cited

U.S. PATENT DOCUMENTS

| | | | | |
|---|---|---|---|---|
| 5,283,904 | A * | 2/1994 | Carson et al. ............. | 710/266 |
| 5,428,799 | A * | 6/1995 | Woods et al. ............. | 710/266 |
| 5,530,891 | A * | 6/1996 | Gephardt .................. | 710/8 |
| 5,619,705 | A * | 4/1997 | Karnik et al. ............. | 710/266 |
| 5,918,057 | A * | 6/1999 | Chou et al. ................ | 710/260 |
| 6,665,761 | B1 * | 12/2003 | Svenkeson et al. ........ | 710/268 |
| 6,738,836 | B1 * | 5/2004 | Kessler et al. ............ | 710/22 |
| 6,993,766 | B2 * | 1/2006 | Campbell et al. .......... | 718/102 |
| 7,089,341 | B2 * | 8/2006 | Kriegel ..................... | 710/266 |
| 7,162,545 | B2 * | 1/2007 | Sudo ........................ | 709/201 |
| 2001/0016879 | A1 | 8/2001 | Sekiguchi et al. | |
| 2005/0138249 | A1 * | 6/2005 | Galbraith et al. .......... | 710/100 |
| 2006/0095624 | A1 * | 5/2006 | Raj et al. .................. | 710/260 |
| 2007/0079039 | A1 * | 4/2007 | Raj ........................... | 710/260 |

FOREIGN PATENT DOCUMENTS

JP   11-149385   1/1998

* cited by examiner

*Primary Examiner*—Paul R. Myers
(74) *Attorney, Agent, or Firm*—Reed Smith LLP; Stanley P. Fisher, Esq.; Juan Carlos A. Marquez, Esq.

(57) ABSTRACT

Interrupt process generated in a processor for arithmetic operation is offloaded onto a system control processor, thereby reducing disturbance to the processor for arithmetic operation. A heterogeneous multiprocessor system includes: means which accepts an interrupt in each CPU; means which inquires the accepted interrupt of an interrupt destination management table to select an interrupt destination CPU; means which queues the accepted interrupt; means which generates an inter-CPU interrupt to the selected interrupt destination CPU; each means which receives the inter-CPU interrupt in the interrupt source CPU, performs interrupt process of the interrupt source CPU, and generates the inter-CPU interrupt to the interrupt source CPU in the interrupt destination CPU; means which performs an interrupt end process; and means which performs interrupt process in its own CPU when the interrupt destination CPU selected as a result of the inquiry to the interrupt destination management table is its own CPU.

14 Claims, 9 Drawing Sheets

| INTERRUPT NUMBER | TRANSFER DESTINATION CPU | INTERRUPT LEVEL | END PROCESS REQUIREMENT |
|---|---|---|---|
| 0 | A | 7 | Yes |
| 1 | A | 1 | No |
| 2 | B | 4 | No |
| ...... | ...... | ...... | ...... |
| 99 | A | 5 | Yes |

FIG. 4

INTERRUPT VECTOR TABLE FOR CPU A

| INTERRUPT NUMBER | INTERRUPT VECTOR |
|---|---|
| 0 | 0xA0100 |
| 1 | 0xA0200 |
| …… | …… |
| 99 | 0xA9900 |

INTERRUPT VECTOR TABLE FOR CPU B

| INTERRUPT NUMBER | INTERRUPT VECTOR |
|---|---|
| 0 | 0xB0100 |
| 1 | 0xB0200 |
| …… | …… |
| 99 | 0xB9900 |

HETEROGENEOUS MULTIPROCESSOR SYSTEM AND OS CONFIGURATION METHOD THEREOF

CROSS-REFERENCE TO RELATED APPLICATION

The present application claims priority from Japanese Patent Application No. JP 2005-341863 filed on Nov. 28, 2005, the content of which is hereby incorporated by reference into this application.

TECHNICAL FIELD OF THE INVENTION

The present invention relates to a heterogeneous multiprocessor system including a processor and an interrupt controller. More particularly, it relates to a technology effectively applied to an operating system (OS) configuration method in the heterogeneous multiprocessor system.

BACKGROUND OF THE INVENTION

An example of a technology regarding the OS configuration method in a processor system is disclosed in Japanese Patent Application Laid-Open Publication No. 11-149385 (Patent Document 1). This patent document 1 discloses the technology capable of simultaneously running a plurality of OSes, which comprises a step of separating a resource managed by a first OS from that managed by other OSes, a step of starting the other OSes, a step of switching the OS to be run, and a step of determining an OS which is to perform interrupt process based on an interrupt factor and starting an appropriate interrupt handler.

SUMMARY OF THE INVENTION

Incidentally, in such a technology as disclosed in the patent document 1, in order to simultaneously run a plurality of OSes on a single computer, resources including interrupts are divided for each OS, and these interrupts are allocated by the setting of an interrupt controller. Also, in this technology, the software does not offload the interrupts. Further, this technology is targeted to the homogeneous processors, and is not the technology in which the interrupt interfaces are unified to allow an appropriate CPU to execute the interrupt processes in order to apply the heterogeneous processor.

For example, if the technology disclosed in the patent document 1 is applied to a heterogeneous processor, a configuration as shown in FIG. 10 will be achieved. More specifically, in a heterogeneous multiprocessor system as shown in FIG. 10 including a job A (101a), a job B (101b), an OS (102), a CPU A (104a), a CPU B (104b), an interrupt controller A (105a), an interrupt controller B (105b), a disk (106), a NW adaptor (107), and others, each CPU has its allocated devices and different interrupt interfaces.

In this heterogeneous multiprocessor system, even when the CPU B (104b) is a processor for arithmetic operation, for example, a control over the interrupts enclosed in ovals in FIG. 10 occurs. In this case, two types of page fault process (for CPU A and for CPU B) have to be provided in the OS (102). Moreover, since the interrupt processes occur in the CPU B (104b) actually performing the arithmetic operations, the performance degradation in the arithmetic operation cannot be avoided.

Therefore, an object of the present invention is to provide a heterogeneous multiprocessor system capable of reducing the disturbance to an arithmetic processor, in which interrupt processes which occur in the arithmetic processor are offloaded onto a system control processor.

The above and other objects and novel characteristics of the present invention will be apparent from the description of this specification and the accompanying drawings.

The typical ones of the inventions disclosed in this application will be briefly described as follows.

The present invention can be applied to a heterogeneous multiprocessor system including at least first and second processors (CPU) and one or a plurality of interrupt controllers, and the system comprises: means which accepts an interrupt in each processor; means which inquires the accepted interrupt of an interrupt destination management table to select an interrupt destination processor; means which queues the accepted interrupt; means which generates an interprocessor interrupt to the selected interrupt destination processor; means which receives the interprocessor interrupt in the interrupt destination processor; means which performs interrupt process of the interrupt source processor in the interrupt destination processor; means which generates the interprocessor interrupt to the interrupt source processor in the interrupt destination processor; means which performs an interrupt end process in the interrupt source processor; and means which performs interrupt process in its own processor when the interrupt destination processor selected as a result of the inquiry to the interrupt destination management table is its own processor.

Also, the present invention can be applied to an OS configuration method for a heterogeneous multiprocessor system including at least first and second processors and one or a plurality of interrupt controllers, and the method comprises: a step of accepting an interrupt in an interrupt source processor; a step of generating interrupt information; a step of determining an interrupt destination processor of the interrupt accepted by the inquiry to an interrupt destination management table in the interrupt source processor; a step of registering the interrupt information to an interrupt queue when the interrupt destination processor is its own processor, setting the interrupt information as "under interrupt process" and performing an interrupt processor in its own processor if the interrupt is possible as a result of the comparison with a current mask level, and returning to a process before the interrupt if the interrupt is not possible as a result of the comparison with the current mask level; and a step of, if the interrupt destination processor is a processor other than its own processor and an end process is required, setting a flag waiting for an end interrupt in the interrupt information, registering the interrupt information in the queue, generating an interprocessor interrupt in the interrupt destination processor, and returning to the process before interrupt.

The effects obtained by typical aspects of the present invention will be briefly described below.

According to the present invention, it is possible to provide a heterogeneous multiprocessor system capable of reducing the disturbance to an arithmetic processor by offloading interrupt processes which occur in the arithmetic processor onto a system control processor.

BRIEF DESCRIPTIONS OF THE DRAWINGS

FIG. 4 is a drawing showing an example of the configuration of an interrupt vector table in the heterogeneous multiprocessor system according to one embodiment of the present invention;

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

Figure 1:
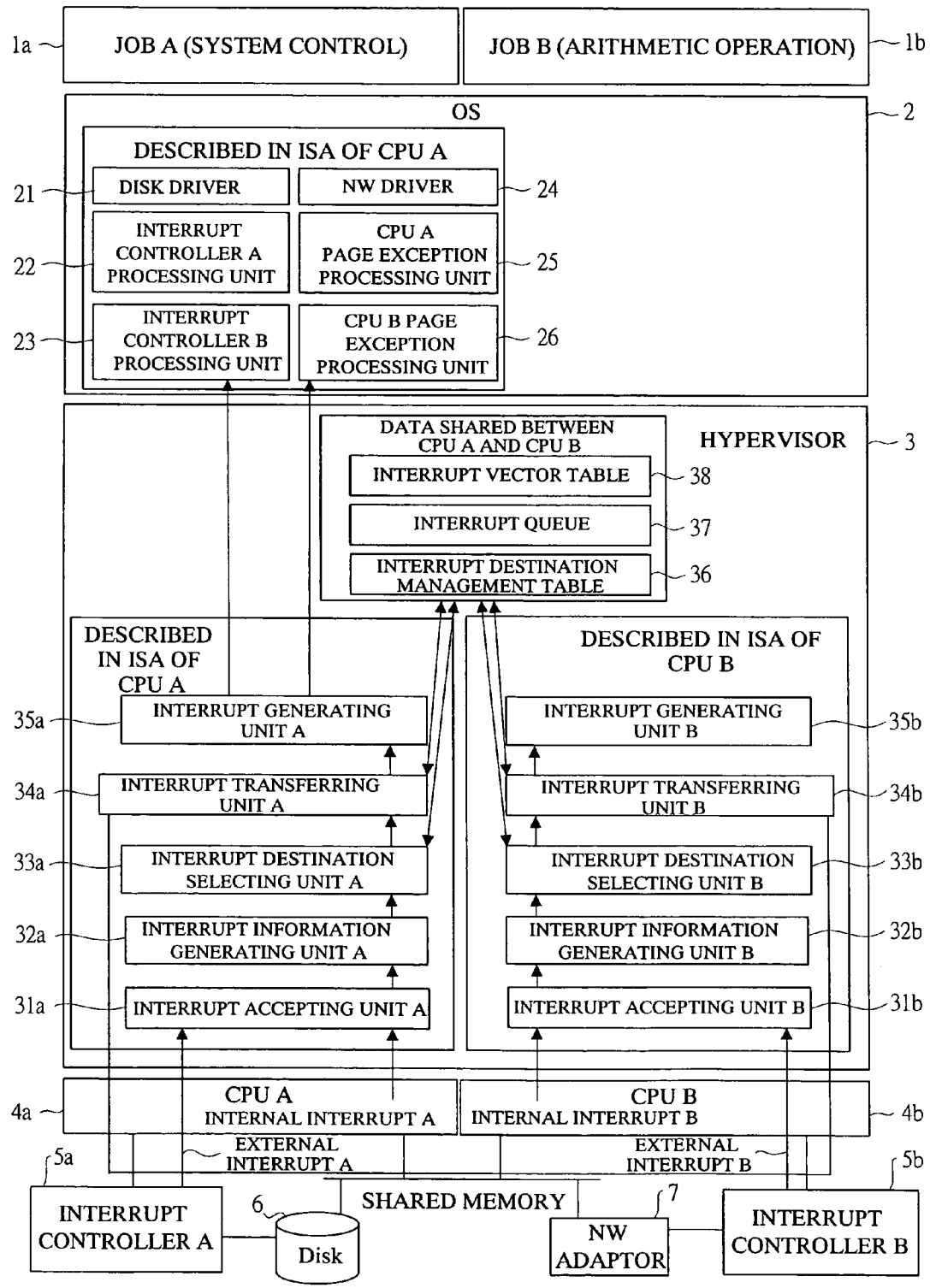
FIG. 1 is a drawing showing an example of the configuration of a heterogeneous multiprocessor system according to one embodiment of the present invention.

First, an example of the configuration of a heterogeneous multiprocessor system according to an embodiment of the present invention will be described with reference to FIG. 1. FIG. 1 is a drawing showing an example of the configuration of a heterogeneous multiprocessor system.

The heterogeneous multiprocessor system according to the present embodiment includes, for example, a job A (1a), a job B (1b), an OS (2), a hypervisor (3), a CPU A (4a), a CPU B (4b), an interrupt controller A (5a), an interrupt controller B (5b), a disk (6), a network (NW) adaptor (7), and others.

The job A (1a) is a user program running on the CPU A (4a) for system control. The job B (1b) is a user program running on the CPU B (4b) mainly for arithmetic operation.

The OS (2) is basic software for executing the user program on the CPU A (4a) and the CPU B (4b). This OS (2) includes software modules described in Instruction Set Architecture (ISA) of the CPU A (4a) such as a disk driver (21), an interrupt controller A processing unit (22), an interrupt controller B processing unit (23), a NW driver (24), a CPU A page exception processing unit (25), and a CPU B page exception processing unit (26). The ISA defines instruction sets of the CPU, and is different for each CPU. Instruction rows described in this ISA provide the codes for each type of CPU.

In the software module in the OS (2), the disk driver (21) manages a disk (6) such as a hard disk. The interrupt controller A processing unit (22) performs interrupt process of the interrupt controller A (5a) associated with the CPU A (4a). The interrupt controller B processing unit (23) performs interrupt process of the interrupt controller B (5b) associated with the CPU B (4b). The NW driver (24) manages the NW adaptor (7). The CPU A page exception processing unit (25) performs page exception process which occurs in the CPU A (4a). The CPU B page exception processing unit (26) performs page exception process that occurs in the CPU B (4b).

The hypervisor (3) is basic software located below the OS (2). This hypervisor (3) includes software modules described in the ISA of the CPU A (4a) such as an interrupt accepting unit A (31a), an interrupt information generating unit A (32a), an interrupt destination selecting unit A (33a), an interrupt transferring unit A (34a), and an interrupt generating unit A (35a), software modules described in the ISA of the CPU B (4b) such as an interrupt accepting unit B (31b), an interrupt information generating unit B (32b), an interrupt destination selecting unit B (33b), an interrupt transferring unit B (34b), and an interrupt generating unit B (35b), and data stored in a storage device and shared between the CPU A (4a) and CPU B (4b) such as an interrupt destination management table (36), an interrupt queue (37), and an interrupt vector table (38).

In the software modules located in the hypervisor and described in the ISA of the CPU A (4a), the interrupt accepting unit A (31a) performs a process of accepting an interrupt inside the interrupt controller A (5a) and the CPU A (4a). The interrupt information generating unit A (32a) generates interrupt information entries including an interrupt number, a transfer source CPU, an interrupt level, and others. The interrupt destination selecting unit A (33a) selects a CPU to which the interrupt process is to be transferred from among its own CPU and a plurality of other CPUs. The interrupt transferring unit A (34a) registers an interrupt information entry in an interrupt queue of the interrupt destination CPU. The interrupt generating unit A (35a) generates an interprocessor interrupt in the interrupt destination CPU and notifies the interrupt transfer.

In the software modules located in the hypervisor and described in the ISA of the CPU B (4b), the interrupt accepting unit B (31b) performs a process of accepting an interrupt inside the interrupt controller B (5b) and the CPU B (4b). The interrupt information generating unit B (32b) generates interrupt information entries including an interrupt number, a transfer source CPU, an interrupt level, and others. The interrupt destination selecting unit B (33b) selects a CPU to which the interrupt process is to be transferred from among its own CPU and a plurality of other CPUs. The interrupt transferring unit B (34b) registers an interrupt information entry in an interrupt queue of the interrupt destination CPU. The interrupt generating unit B (35b) generates an interprocessor interrupt in the interrupt destination CPU and notifies the interrupt transfer.

The interrupt controller A (5a) has a function to notify the CPU A (4a) of an interrupt from a device managed by the interrupt controller A (5a). The interrupt controller B (5b) has a function to notify the CPU B (4b) of an interrupt from a device managed by the interrupt controller B (5b).

Figures 2, 3:
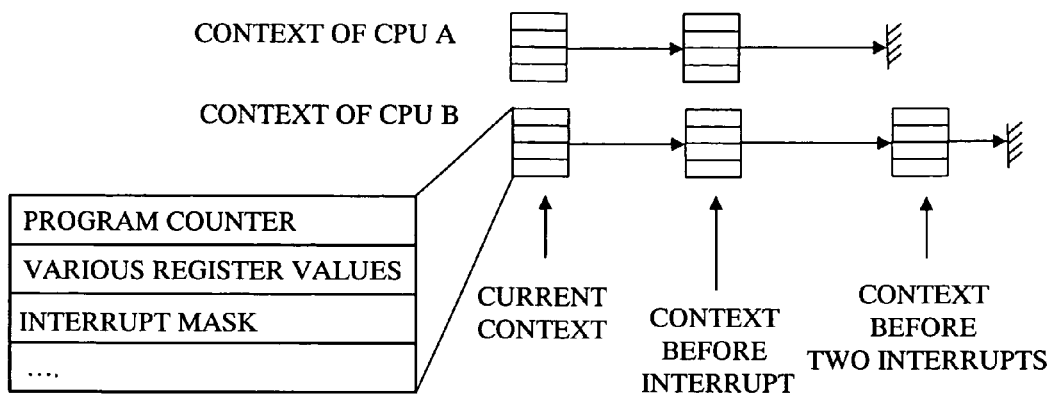
FIG. 2 is a drawing showing an example of a processor context queue in the heterogeneous multiprocessor system according to one embodiment of the present invention.
FIG. 3 is a drawing showing an example of the configuration of an interrupt destination management table in the heterogeneous multiprocessor system according to one embodiment of the present invention.

Next, an example of the configuration of a processor context queue will be described with reference to FIG. 2. FIG. 2 is a drawing showing an example of the processor context queue.

For example, a context queue of the CPU A (4a) includes a current context and a context before interrupt. A context queue of the CPU B (4b) includes a current context, a context before interrupt, and a context before two interrupts. Information, for example, a program counter, various register values, and an interrupt mask is registered in each context.

Next, an example of the configuration of the interrupt destination management table will be described with reference to FIG. 3. FIG. 3 is a drawing showing an example of the configuration of an interrupt destination management table. Note that FIG. 3 shows the interrupt destination management table for the CPU A, and a similar interrupt destination management table is provided also in the CPU B.

An interrupt number and its corresponding information, for example, a transfer destination CPU, an interrupt level, and an end process requirement are stored in the interrupt destination management table (36). The transfer destination CPU indicates whether the CPU is "A" or "B". The interrupt level indicates a level with a numerical value, in which a larger numerical value indicates a higher priority. The end process requirement indicates "Yes" if an end process is required and "No" if an end process is not required. For example, in the case where the interrupt number is "0", the transfer destination CPU is "A", the interrupt level is "7", and the end process requirement is "Yes". Others are as shown in FIG. 3.

Next, an example of the configuration of the interrupt vector table will be described with reference to FIG. 4. FIG. 4 is a drawing showing an example of the configuration of the interrupt vector table.

An interrupt number and its corresponding information such as an interrupt vector are stored in each of the interrupt vector tables (38) of the CPU A (4a) and the CPU B (4b). For example, in the example where the interrupt number is "0", the interrupt vector indicates "0xA0100" in the interrupt vector table of the CPU A. Other examples are as shown in FIG. 4.

Figure 5:
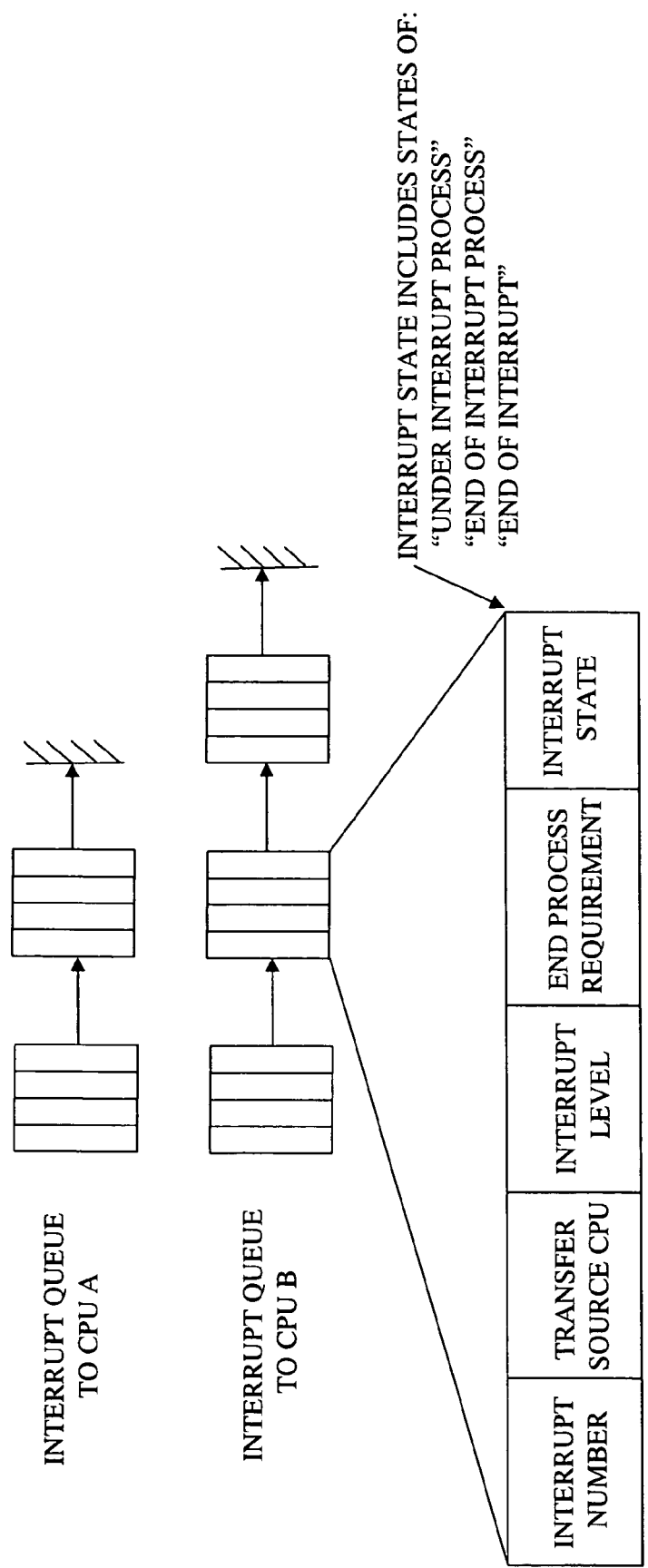
FIG. 5 is a drawing showing an example of the configuration of an interrupt queue in the heterogeneous multiprocessor system according to one embodiment of the present invention.

Next, an example of the configuration of the interrupt queue will be described with reference to FIG. 5. FIG. 5 is a drawing showing an example of the configuration of the interrupt queue.

The interrupt queue (37) includes an interrupt queue to the CPU A (4a) and an interrupt queue to the CPU B (4b). Information, for example, an interrupt number, a transfer source CPU, an interrupt level, end process requirement, and an interrupt state is stored in each of the interrupt queues. The interrupt state includes states of "under interrupt process", "end of interrupt process", and "end of interrupt". The other information is similar to that in FIG. 3 described above.

In the case of the registration for each of these interrupt queues (37), the interrupt information of various types of CPU, that is, the CPU A (4a) and the CPU B (4b) is converted to a unified format for the registration. Also, the interrupt information of various types of interrupt controllers, that is, the interrupt controller A (5a) and the interrupt controller B (5b) is converted to a unified format for the registration.

Next, by way of example, in the heterogeneous multiprocessor system according to the present embodiment, the case where an interrupt is generated in the CPU B (4b), the case where an interprocessor interrupt is generated in the CPU A (4a), the case where interrupt process in the CPU A (4a) is ended, and the case where an interprocessor interrupt is generated in the CPU B (4b) will be described in this order.

Figure 6:
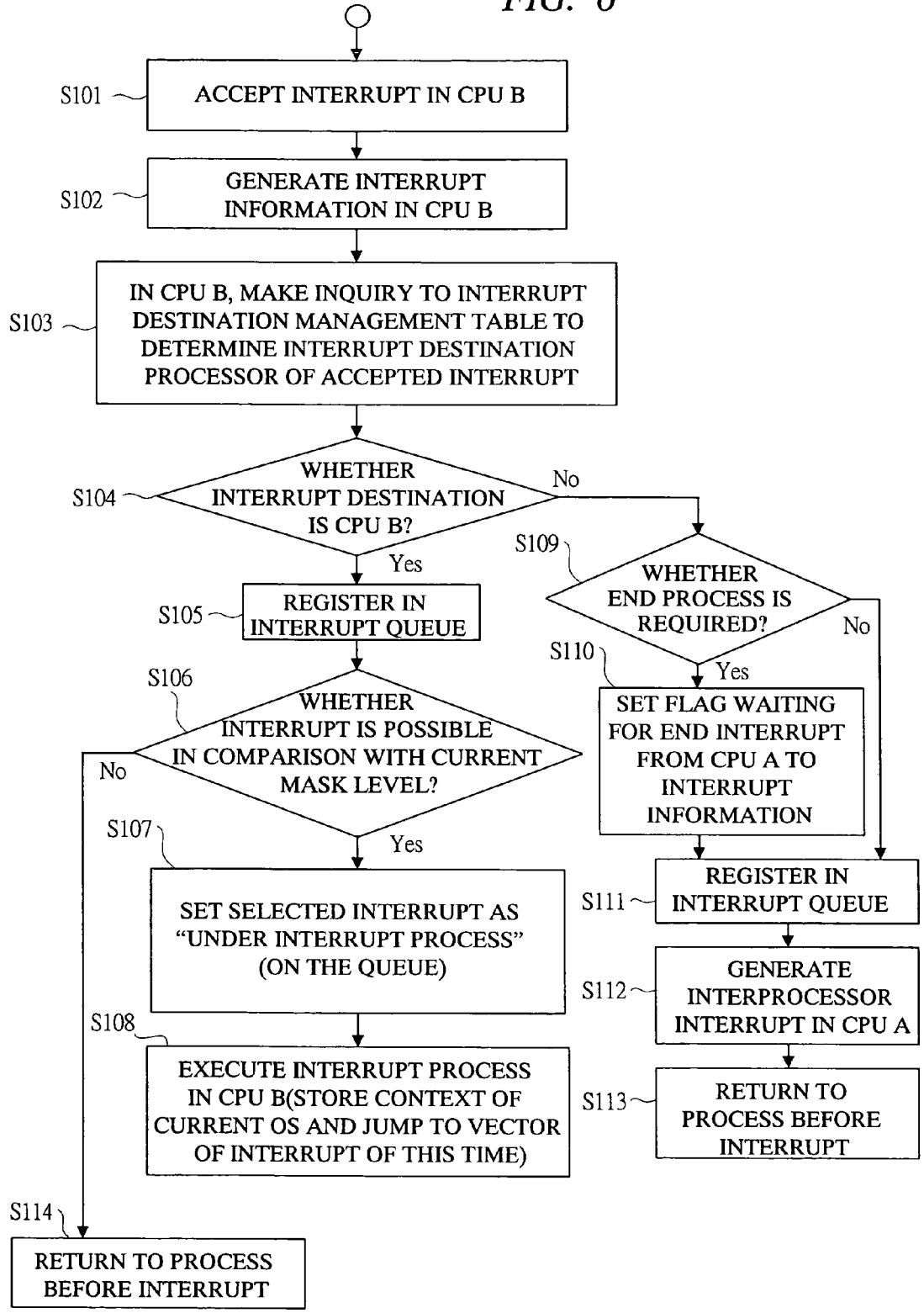
FIG. 6 is a drawing showing an example of a process flow when an interrupt is generated in a CPU B in the heterogeneous multiprocessor system according to one embodiment of the present invention.

First, an example of a process flow when an interrupt is generated in the CPU B will be described with reference to FIG. 6. FIG. 6 is a drawing showing an example of the process flow when an interrupt is generated in the CPU B.

In the process when an interrupt is generated in the CPU B (4b), first, an interrupt is accepted in the interrupt accepting unit B (31b) of the CPU B (4b) (S101), and then interrupt information is generated in the interrupt information generating unit B (32b) (S102). Furthermore, in the interrupt destination selecting unit B (33b) of the CPU B (4b), an interrupt destination processor of the accepted interrupt is determined through the inquiry to the interrupt destination management table (36) (S103). Thereafter, it is determined whether the interrupt destination is the CPU B (4b) (S104). As a result of this determination, if the interrupt destination is the CPU B (4b) (Yes), it is registered to the interrupt queue (37) by the interrupt transferring unit B (34b) (S105).

Next, in comparison with the current mask level, it is determined whether the interrupt is possible (S106). As a result of the determination, if an interrupt is possible (Yes), the selected interrupt is set as "under interrupt process" on the interrupt queue (37) (S107). Then, interrupt process is executed in the CPU B (4b) (S108). In this execution of the interrupt process, the context of the current OS is stored, and a jump is made to a vector of the interrupt of this time.

Also, as a result of the determination in S104, if the interrupt destination is not the CPU B (4b) (No), it is determined whether an end process is required (S109). As a result of the determination, if it is required (Yes), a flag waiting for an end interrupt from the CPU A (4a) is set in the interrupt information (S110). Furthermore, it is registered in the interrupt queue (37) (S111), an interprocessor interrupt is generated in the CPU A (4a) by the interrupt generating unit B (35b) (S112), and then, the procedure returns to the process before interrupt (S113).

Also, as a result of the determination in S106, if an interrupt is not possible (No), the procedure returns to the process before interrupt (S114).

Furthermore, as a result of the determination in S109, if an end process is not required (No), the procedure goes to S111, in which the registration is made in the interrupt queue (37), and then an interprocessor interrupt is generated in the CPU A (4a) (S112). Thereafter, the procedure returns to the process before interrupt (S113).

In the manner as described above, the process when an interrupt is generated in the CPU B (4b) is performed.

Figure 7:
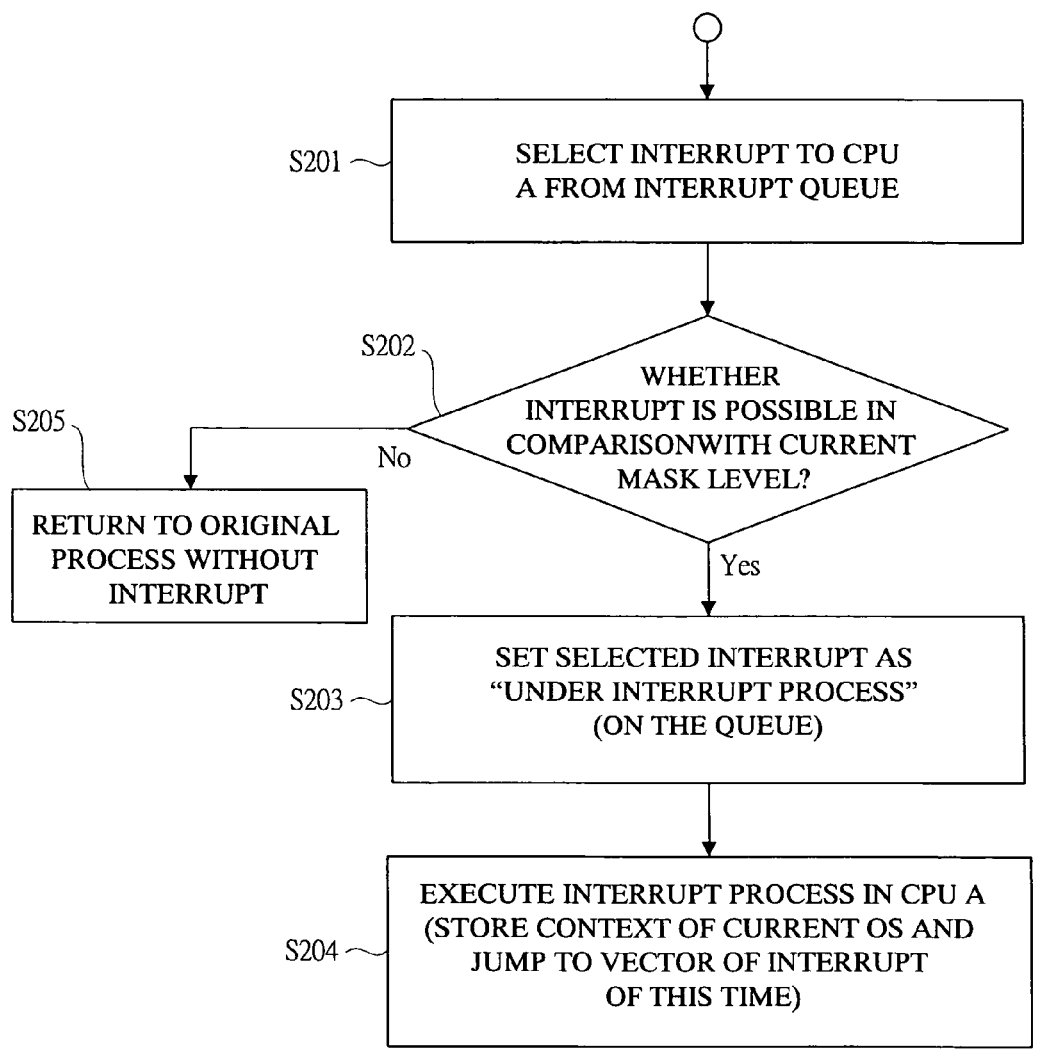
FIG. 7 is a drawing showing an example of a process flow when an interprocessor interrupt is generated in a CPU A in the heterogeneous multiprocessor system according to one embodiment of the present invention.

Next, an example of a process flow when an interprocessor interrupt is generated in the CPU A will be described with referenced to FIG. 7. FIG. 7 is a drawing showing an example of the process flow when an interprocessor interrupt is generated in the CPU A.

In the process when an interprocessor interrupt is generated in the CPU A (4a), first, an interrupt to the CPU A (4a) is selected from the interrupt queue (37) (S201), and it is compared with the current mask level to determine whether an interrupt is possible (S202). As a result of the determination, if an interrupt is possible (Yes), the selected interrupt is set as "under interrupt process" on the interrupt queue (37) (S203). Then, interrupt process is executed in the CPU A (4a) (S204). In the execution of the interrupt process, the context of the current OS is stored, and a jump is made to a vector of the interrupt of this time.

On the other hand, as a result of the determination in S202, if an interrupt is not possible (No), the procedure returns to the original process without interrupt (S205).

In the manner as described above, the process when an interprocessor interrupt is generated in the CPU A (4a) is performed.

Figure 8:
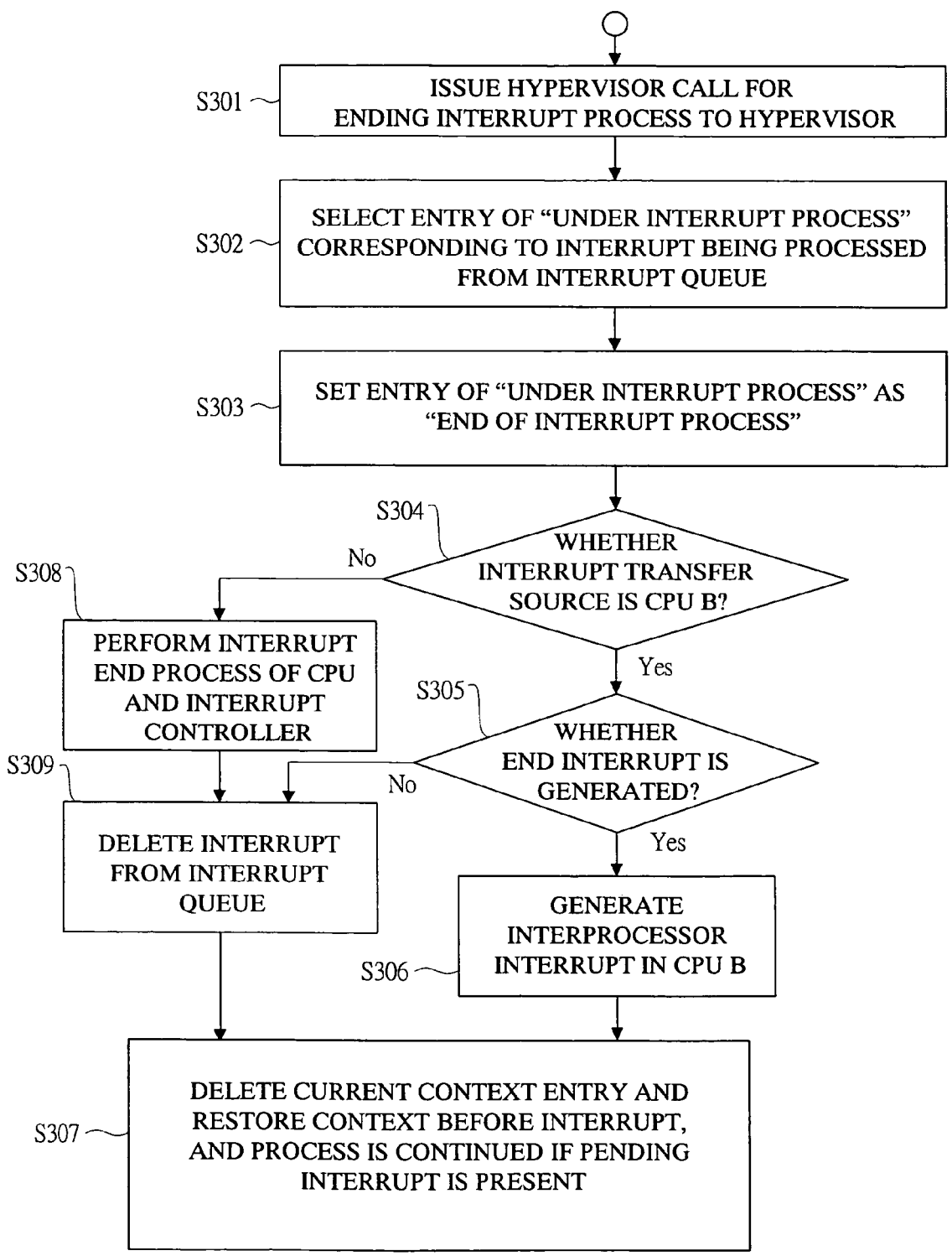
FIG. 8 is a drawing showing an example of a process flow when interrupt process in the CPU A is ended in the heterogeneous multiprocessor system according to one embodiment of the present invention.

Next, an example of a process flow when interrupt process in the CPU A is ended will be described with reference to FIG. 8. FIG. 8 is a drawing showing an example of the process flow when interrupt process in the CPU A is ended.

In the process when interrupt process in the CPU A (4a) is ended, first, a hypervisor call for ending the interrupt process is issued to the hypervisor (3) (S301), and then an entry of "under interrupt process" corresponding to the interrupt being processed is selected from the interrupt queue (37) (S302). Thereafter, the entry of "under interrupt process" is set as "end of interrupt process" (S303).

Subsequently, it is determined whether the interrupt transfer source is the CPU B (4b) (S304). As a result of the determination, if it is the CPU B (4b) (Yes), it is determined whether an end interrupt is to be generated (S305). As a result of the determination, if an end interrupt is to be generated (Yes), an interprocessor interrupt is generated in the CPU B (4b) (S306). Then, the current context entry is deleted, a context before interrupt is restored, and the process is further continued if a pending interrupt is present (S307).

On the other hand, as a result of the determination in S304, if the interrupt transfer source is not the CPU B (4b) (No), an interrupt end process of the CPU and the interrupt controller is performed (S308). Then, the interrupt is deleted from the interrupt queue (37) (S309), and then the procedure goes to S307, in which the current context entry is deleted, the context before interrupt is restored, and the process is further continued if a pending interrupt is present.

Also, as a result of the determination in S305, if an end interrupt is not generated (No), the procedure goes to S309, in which the interrupt is deleted from the interrupt queue (37), and then, the current context entry is deleted, the context before interrupt is restored, and the process is further continued if a pending interrupt is present (S307).

In the manner as described above, the process when the interrupt process in the CPU A (4a) is ended is performed.

Figure 9:
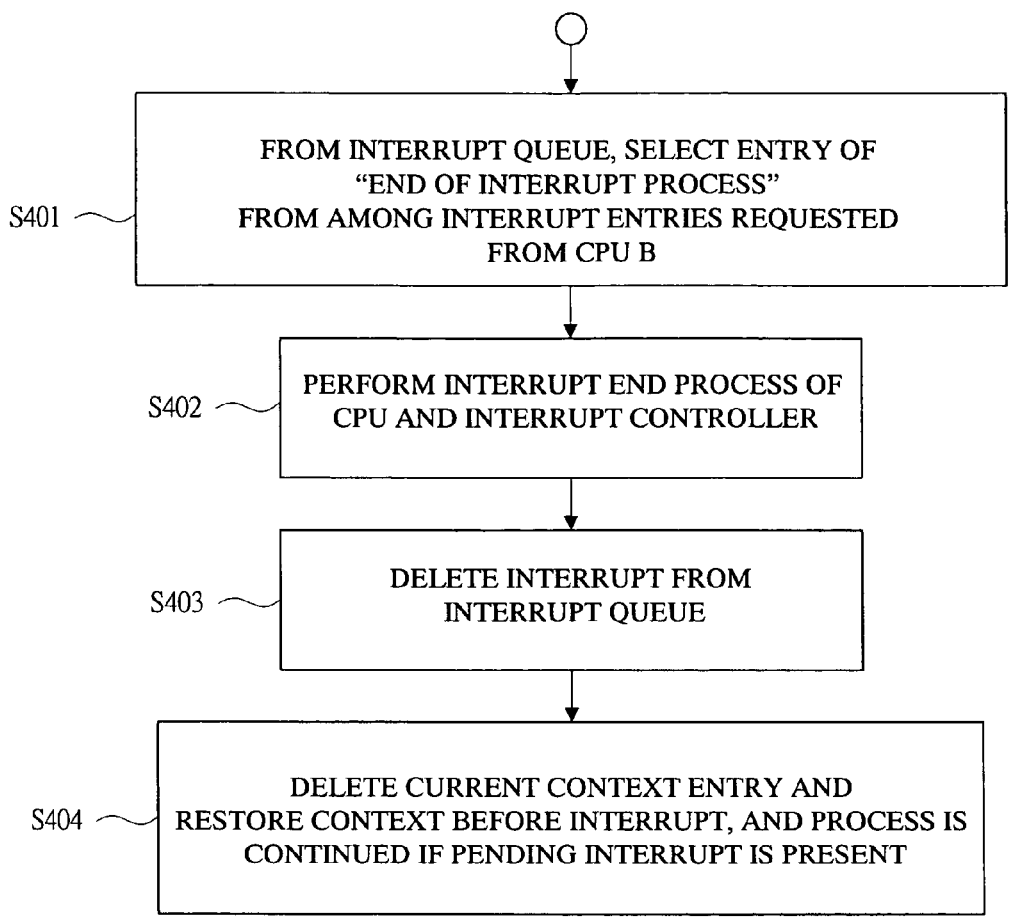
FIG. 9 is a drawing showing an example of a process flow when an interprocessor interrupt is generated in the CPU B in the heterogeneous multiprocessor system according to one embodiment of the present invention.
Figure 10:
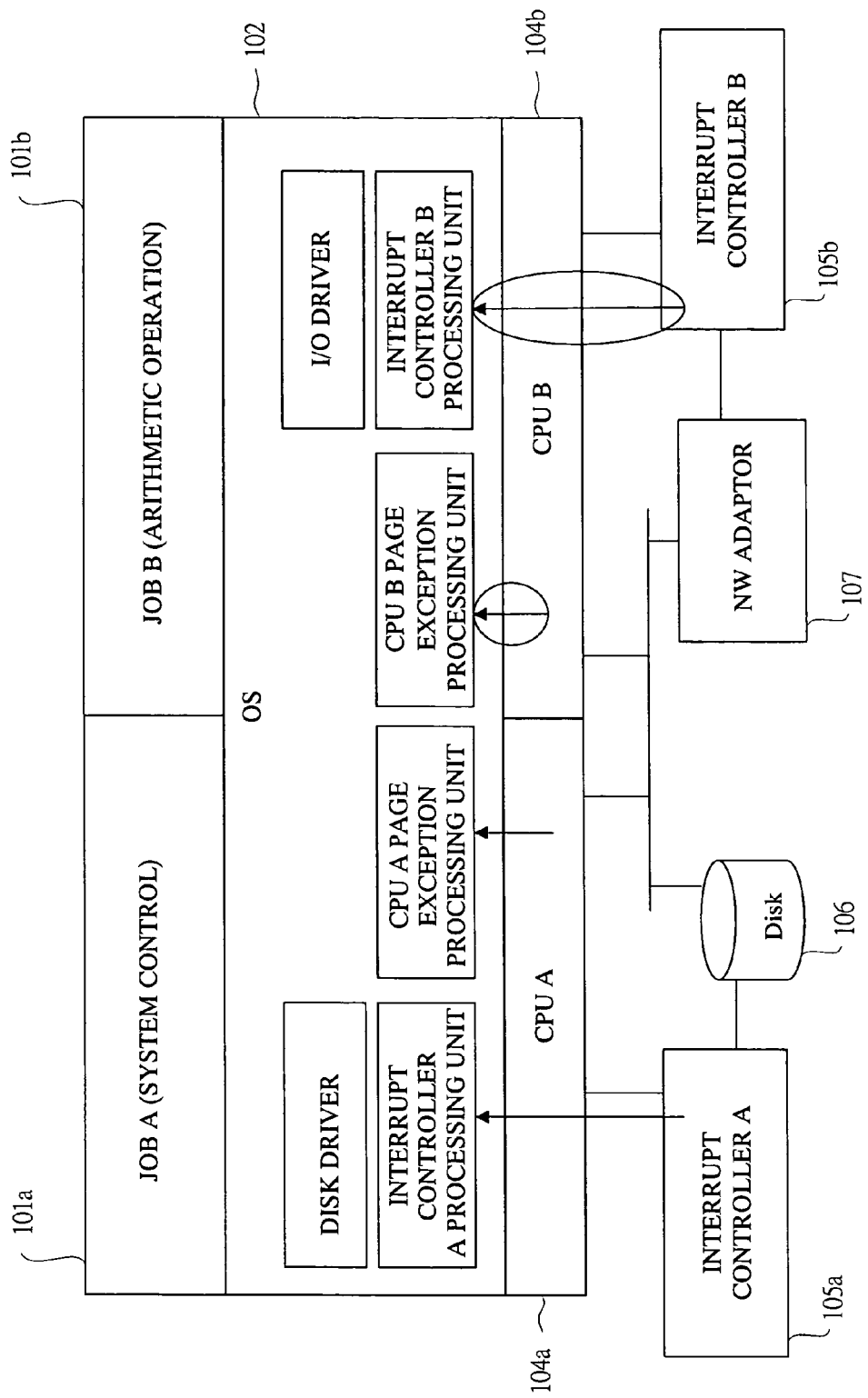
FIG. 10 is a drawing showing an example of the configuration of a heterogeneous multiprocessor studied as a premise of the present invention.

Next, an example of a process flow when an interprocessor interrupt is generated in the CPU B will be described with reference to FIG. 9. FIG. 9 is a drawing showing an example of a process flow when an interprocessor interrupt is generated in the CPU B.

In the process when an interprocessor interrupt is generated in the CPU B (4b), first, an entry of "end of interrupt process" is selected from among interrupt entries requested from the CPU B (4b) based on the interrupt queue (37) (S401). Then, an interrupt end process of the CPU and the interrupt controller is performed (S402). Then, the interrupt is deleted from the interrupt queue (37) (S403). Thereafter, the current context entry is deleted, the context before interrupt is restored, and the process is further continued if a pending interrupt is present (S404).

In the manner as described above, the process when an interprocessor interrupt is generated in the CPU B (4b) is performed.

As described above, according to the heterogeneous multiprocessor system of the present embodiment, interrupt process that occurs in the CPU B (4b) which mainly performs the arithmetic operation is offloaded onto the CPU A (4a) which performs the system control. Therefore, it is possible to reduce the disturbance to the CPU B (4b). As a result, performance degradation in the arithmetic operation can be suppressed.

Note that, in the embodiment described above, the interrupt destination management table (36) is placed in a storage device shared between the CPU A (4a) and the CPU B (4b) to share it. Alternatively, it is also preferable to use communication means between the CPUs so as to keep the consistency in the interrupt destination management tables stored in storage devices unique to each of the CPUs.

Also, when a CPU in which the interrupt is possible is selected based on the interrupt destination management table (36), a determination is made by the comparison with the current mask level. However, if there are a plurality of CPUs in which the interrupt is possible, a physically close CPU in a non-uniform memory access (NUMA) configuration may be selected, or a CPU high in processing capability may be selected.

In the foregoing, the invention made by the inventors of the present invention has been concretely described based on the embodiment. However, it is needless to say that the present invention is not limited to the foregoing embodiment and various modifications and alterations can be made within the scope of the present invention.

The present invention relates to a heterogeneous multiprocessor system including a processor and an interrupt controller. More particularly, the present invention is effectively applied to an OS configuration method in the heterogeneous multiprocessor system.

What is claimed is:

1. A heterogeneous multiprocessor system including at least first and second processors and one or a plurality of interrupt controllers, said system comprising:

first means which accepts an interrupt in each processor;

second means which inquires said accepted interrupt of an interrupt destination management table to select an interrupt destination processor;

third means which queues said accepted interrupt;

fourth means which generates an interprocessor interrupt to said selected interrupt destination processor;

fifth means which receives said interprocessor interrupt in said interrupt destination processor;

sixth means which performs interrupt process of the interrupt source processor in said interrupt destination processor;

seventh means which generates said interprocessor interrupt to said interrupt source processor in said interrupt destination processor;

eighth means which performs an interrupt end process in said interrupt source processor; and ninth means which performs interrupt process in its own processor when said interrupt destination processor selected as a result of the inquiry to said interrupt destination management table is its own processor.

2. The heterogeneous multiprocessor system according to claim 1, wherein said first means includes:

means which accepts an interrupt from an interrupt controller; and means which accepts an interrupt caused from inside of a processor.

3. The heterogeneous multiprocessor system according to claim 2, wherein said first means includes codes for each type of the processors which execute an interrupt accepting process.

4. The heterogeneous multiprocessor system according to claim 1, wherein said second means shares said interrupt destination management table by placing it in a storage device shared in said heterogeneous multiprocessor system or keeps consistency in the interrupt destination management table in a storage device unique to the processor by using interprocessor communication means.

5. The heterogeneous multiprocessor system according to claim 4,
wherein said second means includes:
means which selects an entry of said interrupt destination management table by using a generated processor number and interrupt number; and
means which takes, from said selected entry, information regarding a transfer destination processor, an interrupt level, and whether an end process is required.

6. The heterogeneous multiprocessor system according to claim 5,
wherein said second means includes means which selects a processor in which the interrupt is possible based on mask levels of processors when there are a plurality of processors in which the interrupt is possible in said interrupt destination management table.

7. The heterogeneous multiprocessor system according to claim 5,
wherein said second means includes means which selects a physically close processor in a NUMA configuration or the like when there are a plurality of processors in which the interrupt is possible in said interrupt destination management table.

8. The heterogeneous multiprocessor system according to claim 5,
wherein said second means includes means which selects a processor high in processing capability when there are a plurality of processors in which the interrupt is possible in said interrupt destination management table.

9. The heterogeneous multiprocessor system according to claim 1,
wherein said third means includes:
means which sets, in interrupt information, a flag indicating whether an end interrupt is required in accordance with whether an end process of the selected entry is required; and
means which registers the interrupt information in an interrupt queue.

10. The heterogeneous multiprocessor system according to claim 9,
wherein said third means includes:
means which converts interrupt information of various types of processors to a unified format and registers it in said interrupt queue; and
means which converts interrupt information of various types of interrupt controllers to a unified format and registers it in said interrupt queue.

11. An OS configuration method for a heterogeneous multiprocessor system including at least first and second processors and one or a plurality of interrupt controllers, said method comprising:
a first step of accepting an interrupt in an interrupt source processor;
a second step of generating interrupt information;
a third step of determining an interrupt destination processor of the accepted interrupt by the inquiry to an interrupt destination management table in said interrupt source processor;
a fourth step of registering said interrupt information to an interrupt queue when said interrupt destination processor is its own processor, setting said interrupt information as "under interrupt process" and performing an interrupt process in its own processor if the interrupt is possible as a result of the comparison with a current mask level, and returning to a process before the interrupt if the interrupt is not possible as a result of the comparison with the current mask level; and
a fifth step of, if said interrupt destination processor is a processor other than its own processor and an end process is required, setting a flag waiting for an end interrupt in said interrupt information, registering said interrupt information in the interrupt queue, generating an interprocessor interrupt in said interrupt destination processor, and returning to the process before interrupt.

12. The OS configuration method for the heterogeneous multiprocessor system according to claim 11,
wherein said fourth steps includes:
a step of selecting said interrupt information from said interrupt queue to said interrupt destination processor;
a step of comparing an interrupt level included in said interrupt information with an interrupt mask level of an interrupt destination processor context to determine whether an interrupt is possible;
a step of setting an interrupt state of said selected interrupt information as "under interrupt process";
a step of storing a processor context before interrupt in an entry of a processor context queue in said interrupt destination processor;
a step of generating a new processor context entry and registering it in said processor context queue in said interrupt destination processor; and
a step of taking an interrupt vector from a vector table of said interrupt destination processor to execute it.

13. The OS configuration method for the heterogeneous multiprocessor system according to claim 12,
wherein said fourth step includes:
a step of informing a hypervisor of an end of interrupt process when the interrupt process in said interrupt destination processor ends;
a step of selecting interrupt information corresponding to the interrupt being processed from said interrupt queue;
a step of setting said selected interrupt information as "end of interrupt process";
a step of generating an interprocessor interrupt to a transfer source processor when the interrupt transfer source is a processor other than its own processor and an end interrupt has to be generated;
a step of performing an interrupt end process of the processor or the interrupt controller and deleting the interrupt information from said interrupt queue when said interrupt transfer source is its own processor; and
a step of deleting a current context from said processor context queue and executing a process with using a context before interrupt as a current context.

14. The OS configuration method for the heterogeneous multiprocessor system according to claim 13,
wherein said fourth step includes:
a step of selecting interrupt information indicating "end of interrupt process" from said interrupt queue;
a step of performing the interrupt end process of said processor or interrupt controller and deleting the interrupt information from said interrupt queue; and
a step of deleting the current context from said processor context queue and executing the process with using the context before interrupt as the current context.

* * * * *